(12) United States Patent
Jun

(10) Patent No.: US 6,931,594 B1
(45) Date of Patent: Aug. 16, 2005

(54) MULTI-LEVEL POSITION DESIGNATING METHOD FOR A MULTIMEDIA STREAM

(75) Inventor: Sung Bae Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 09/703,608

(22) Filed: Nov. 2, 2000

(30) Foreign Application Priority Data

Nov. 5, 1999 (KR) .................................. 1999/48903

(51) Int. Cl.[7] .............................................. G09G 5/00
(52) U.S. Cl. ................................................... 715/719
(58) Field of Search ............................. 345/719, 720, 345/721, 722, 723, 724; 715/719, 720, 721, 715/722, 723, 724, 725, 726

(56) References Cited

U.S. PATENT DOCUMENTS

| | | | |
|---|---|---|---|
| 5,889,519 A | * | 3/1999 | Boezeman et al. ......... 345/723 |
| 5,956,026 A | * | 9/1999 | Ratakonda ................... 345/723 |
| 5,999,173 A | * | 12/1999 | Ubillos ........................ 345/724 |
| 6,204,840 B1 | * | 3/2001 | Petelycky et al. ........ 715/500.1 |
| 6,469,711 B2 | * | 10/2002 | Foreman et al. ............ 345/723 |

FOREIGN PATENT DOCUMENTS

| | | |
|---|---|---|
| JP | 06-309370 | 4/1994 |
| JP | 06-309370 | 11/1994 |
| JP | 07-303234 | 11/1995 |

* cited by examiner

*Primary Examiner*—Kristine Kincaid
*Assistant Examiner*—Thanh Vu
(74) *Attorney, Agent, or Firm*—Fleshner & Kim, LLP

(57) ABSTRACT

A multi-level position or range designating method for browsing, editing and indexing a multimedia stream is disclosed. The present method continuously sets a general range designated by a user from a previous level as an entire multimedia stream for a present level to display a more detailed view of the multimedia stream, such that a user can make a more minute designation of a desired range.

25 Claims, 3 Drawing Sheets starting frame  ending frame

MULTI-LEVEL POSITION DESIGNATING METHOD FOR A MULTIMEDIA STREAM

BACKGROUND OF THE INVENTION

1. Field of the Invention

The present invention relates to a multimedia browser and more particularly, to a multi-level position designating method for browsing, editing and indexing a multimedia stream.

2. Description of the Related Art

Generally, a user can obtain information while viewing a multimedia stream as it is played. However, because a multimedia stream is a series of continuous frame units, if a user wishes to view a certain portion of a multimedia stream, the user must designate the starting and ending positions of a range of interest in the multimedia stream. Thus, a user interface which allows a user to designate a certain position or range of a multimedia stream is necessary for a user to browse, edit or index a multimedia stream.

Particularly, a multimedia stream such as a motion movie, drama, or sports has a running time of at least several tens of minutes. Thus, if a user wishes to skip to a certain position or view a certain range of a multimedia stream, an interface for designating a position or range designating of a multimedia stream is necessary. Also, to generate data such as meta-data and to index information such as casting for a multimedia stream, an interface for designating a position/range of a multimedia stream would be necessary.

Accordingly, position/range designating methods have been proposed in the related art, in which a user can select a position or range on a multimedia stream by designating a starting and ending positions using a time axis. FIG. 1 shows an example of a position/range designating user interface for a multimedia stream in the related art.

Referring to FIG. 1, an entire multimedia stream A~B is linearly displayed using a scroll bar or slider control, and a range E~F with a starting and ending positions can be designated through an input device. When a range is designated, the user interface displays the starting frame and the ending frame of the range E~F such that a user can determine if the correct range has been selected. As shown, the entire multimedia stream A~B is represented by a one-level display and using the one-level display, the range E~F must be designated.

However, in the above user interface, an entire multimedia stream is displayed by an identical one-level screen as shown in FIG. 1, regardless of the length of the multimedia stream. Therefore, a user would have more difficulty in making a minute or fine selection in a multimedia stream with a longer running time than a multimedia stream with a shorter running time.

For example, assume multimedia stream X has a length of 100 frames and multimedia stream Y has a length of 50 frames. Both multimedia streams X and Y would be represented by a scroll bar or slider control of a constant length A~B, even though the multimedia stream X has a length twice the length of the multimedia stream Y. Accordingly, assuming that the minimum selection range of the multimedia stream Y is 2 frames, the minimum selection range of the multimedia stream X would be 4 frames. Similarly, the minimum selection range of a multimedia stream having a length of 1000 frames would be 40 frames. Therefore, in such case, a user cannot designate and view a range smaller than 40 frames.

In other words, the greater the length of a multimedia stream, the greater the difficulty to make a fine designation of the multimedia stream. As a result, a user must scroll or slide forwards and backwards along the entire multimedia stream A~B in frame units of the minimum range to find a desired position of the multimedia stream. However, the greater the number of scrolling, the greater the period necessary for a user to find a desired position. Particularly, a substantial period of time would be necessary if a moving picture encoding method such as MPEG is used to implement the user interface. Thus, reducing the number of scrolling would improve the efficiently of the position/range designating user interface.

As discussed above, a position/range designating method in the related art allows a user to select a position or a range by a designation of the starting and ending positions of a desired range. Here, the designation can be made using an input device such as a mouse or a keyboard and using an interface such as a scroll bar or a slider control. Also, a scroll bar or slider control of a constant length is used to represent all multimedia stream, making it difficult for a user to make a fine adjustment in selecting a desired position or range.

Alternatively, a starting position and ending position of a multimedia stream can directly be input by a user. However, because the user must know the exact or absolute value, i.e. the frame number, of the position to be designated, it is more difficult for general users to use the direct input method.

SUMMARY OF THE INVENTION

Accordingly, an object of the present invention is to solve at least the problems and disadvantages of the related art.

Another object of the present invention is to provide an efficient and user-friendly position/range designating method for browsing, editing, and indexing a multimedia stream.

A further object of the invention is to provide a position/range designating method which displays a multimedia stream to allow a user to more accurately select a desired position or range of the multimedia stream.

A still further object of the invention is to provide a multi-level position/range designating method for browsing, editing and indexing a multimedia stream.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a multi-level position/range designating method for a multimedia stream comprises (1) displaying a first level with the entire range of a multimedia stream; (2) setting a designated range from the first level as an absolute range of the multimedia stream and displaying the absolute range in a second level, if a range is designated from the first level; (3) setting a designated range from a previous level as an absolute range of the multimedia stream and displaying the absolute level in a next level, if a range is designated from the previous level; and repeating (3).

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the present invention, examples of which are illustrated in the accompanying drawings. Generally, the present invention allows a user to make a fine or minute selection of a position or range of a multimedia stream through a user-friendly multi-level display of the multimedia stream. Thus, the user can easily and efficiently browse, edit or index a multimedia stream.

Figure 1:
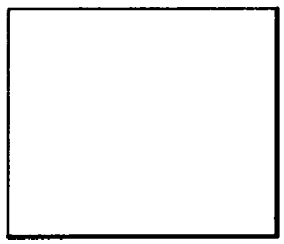
FIG. 1 shows an example of a position/range designating user interface for a multimedia stream in the related art.
Figure 1:
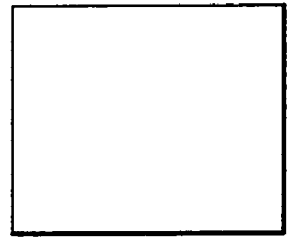
Figure 1:
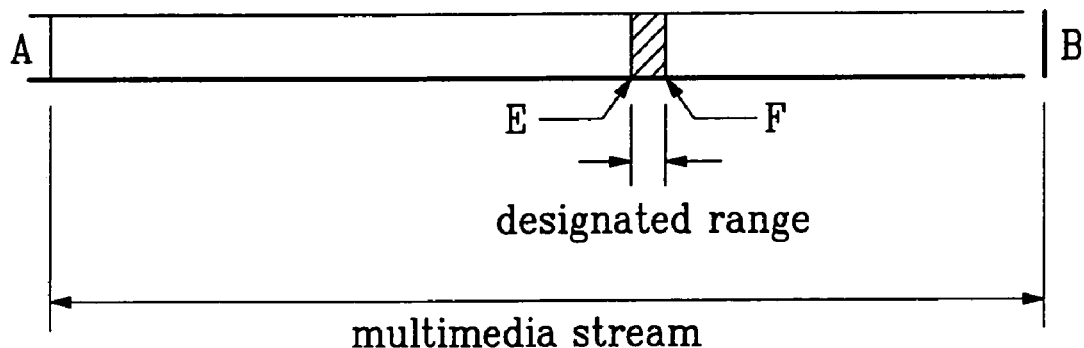
Figure 2:
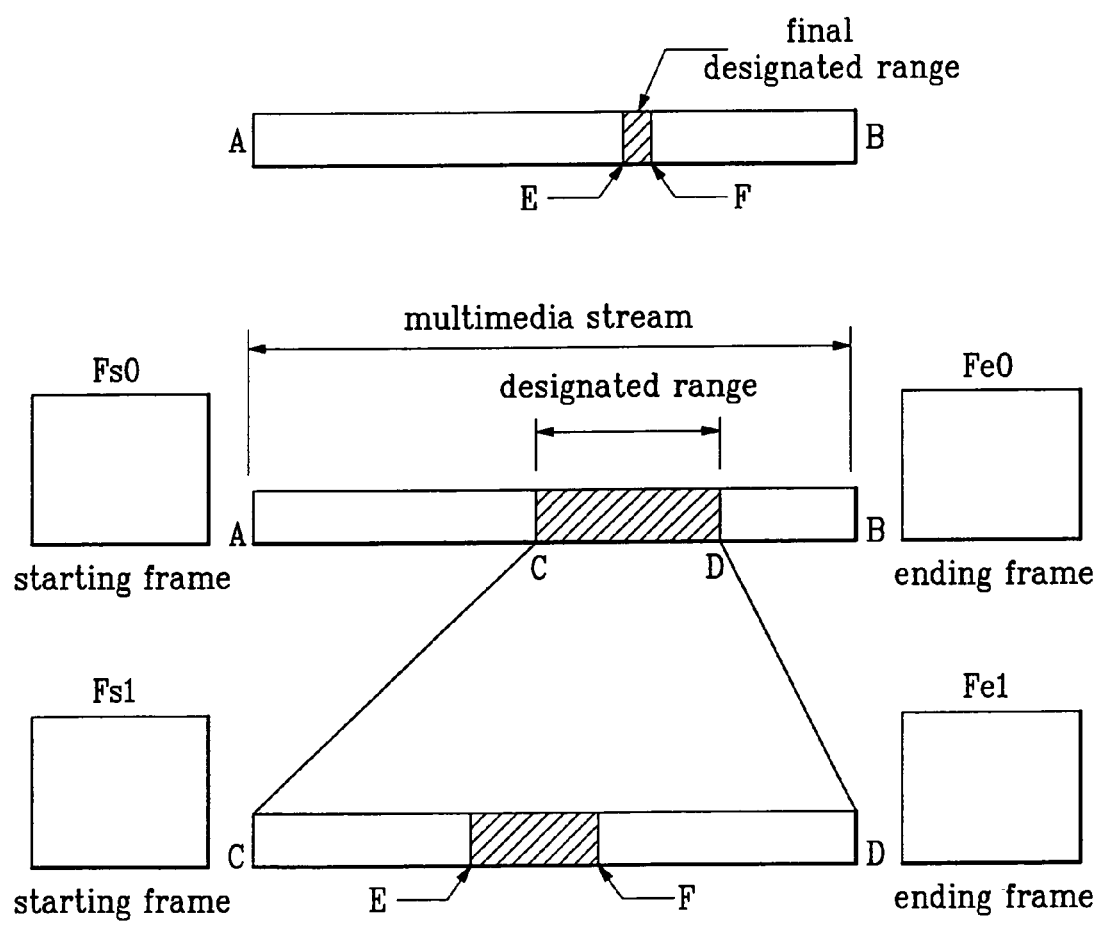
FIG. 2 shows an example of a multi-level position/range designating user interface for a multimedia stream according to a first embodiment of the present invention.

FIG. 2 shows an example screen including a multi-level position/range designating user interface according to the present invention.

Referring to FIG. 2, a first level 0 is set to display an entire multimedia stream A~B. Thereafter, if a user designates a range C~D from the range A~B, i.e. the entire multimedia stream, displayed by level 0, a second level 1 is set to display in detail the designated range C~D as the absolute multimedia stream. In other words, both the entire multimedia stream A~B and the range C~D are represented by a scroll bar or slider control of the same length. Finally, the user can designate a minute range E~F of the entire multimedia stream A~B using the displayed range C~D as the absolute multimedia stream. Here, the starting frames Fs0 and Fs1, and the ending frames Fe0 and Fe1 for the designated range C~D and E~F are respectively displayed at each level.

Namely, to make a fine or minute selection of a desired range E~F, a user can first approximately designate a general range C~D from level 0 which displays the entire multimedia stream. Thereafter, the user can more specifically designate the desired range E~F from level 1 which displays the range C~D as the absolute multimedia stream.

Therefore, level 0 of the present user interface is set to display an entire multimedia stream range A~B, and if a general range C~D is designated from level 0, the range C~D is considered as an entire multimedia stream, i.e. the absolute multimedia stream, at level 1. That is, a detail representation of the range C~D within the range A~B is displayed. As a result, a range E~F desired by a user can be designated, and if necessary, a third level 2 can further be displayed in which the range E~F would be considered the absolute multimedia stream. Accordingly, multiple level representation of a multimedia stream can be displayed, where each level displays a more detailed but shorter range of the multimedia stream to allow a user to achieve a more minute range designation using more detailed views.

Figure 3:
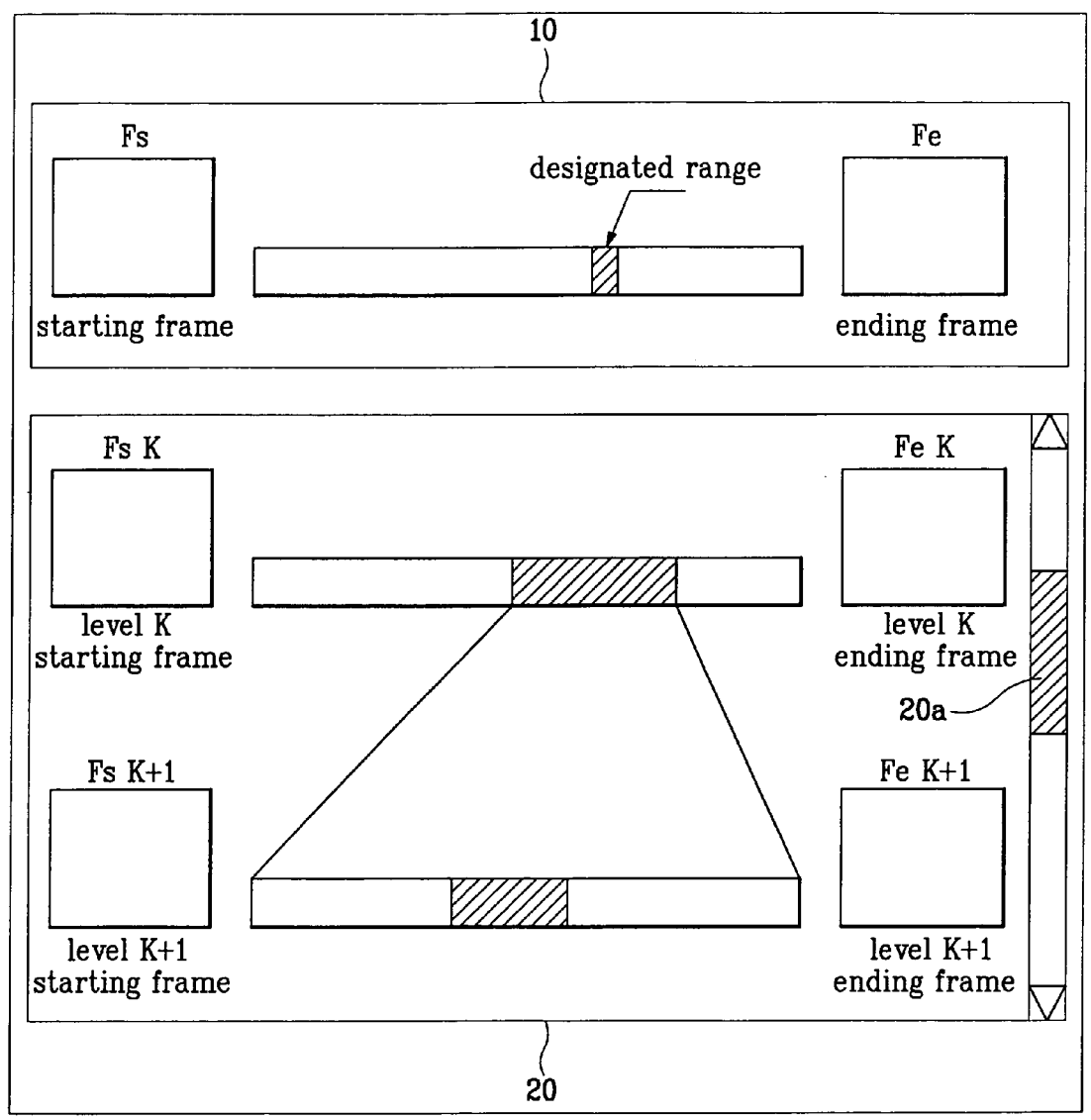
FIG. 3 shows an example of a multi-level position/range designating user interface for a multimedia stream according to a second embodiment of the present invention.

However, if a user continuously wishes to display a more detailed view of a multimedia stream, the multi-level position/range designating user interface cannot display the required number of levels in the limited display area of a screen. Thus, FIG. 3 shows an example screen including a multi-level position/range designating user interface according to a second embodiment the present invention. Namely, the second embodiment allows an efficient display of a multi-level representation of a multimedia stream in a limited display area.

Referring to FIG. 3, a first window 10 displays a first level which includes a scroll bar or slider control representing an entire multimedia stream, and a starting frame Fs and an ending frame Fe of a range designated from the entire multimedia stream. In addition, a second window 20 displays subsequent levels {k, k+1, . . . , k+n}, where each level includes a scroll bar or slider control representing a range designated from a previous level as the absolute multimedia stream and includes a starting frame {Fsk, fsk+1, . . . , Fsk+n} and ending frames {fek, fek+1, . . . , fek+n} for corresponding to a range designated from the absolute multimedia stream.

In the window 20, previous levels {0, 1, . . . , k−1} and subsequent levels {k, k+1, k+2, . . . , k+n} can be displayed as necessary by controlling a scroll bar 20a. Although the present embodiment places the scroll bar 20a on the right side of the user interface 20, the scroll bar 20a may be positioned in other locations such as the left side. Also, input interfaces other than a scroll bar can be used to display the multi-level representations of a multimedia stream.

Thus, a level including a most current and most detailed range designation can be displayed as well as previous levels by manipulating the scroll bar 20a. Accordingly, a user can view different levels with different ranges of a multimedia stream to skip to or view a desired portion of the multimedia stream.

As described above, in the user interface of the present invention, an entire range or a partial range of a multimedia stream can be displayed more efficiently in a limited display area, thereby allowing a more user friendly way for a user to select a desired range of the multimedia stream. Moreover, when compared with a position/range designating interface in the related art having only level 0, the position/range designating interface of the present invention has multi-levels such that even for a lengthy multimedia stream, a general position or range designation and a minute position or range designation of the multimedia stream can be made.

In addition, the position/range designating interface according to the present invention allows an efficient display of the multi-level representations of a multimedia stream using a scroll bar. Finally, there is no limit in the number of levels, such that a user can achieve a minute range adjustment to select a desired range using each level.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A multi-level position/range designating method for a multimedia stream comprising:
   (a) displaying an entire first range of a multimedia stream; and
   (b) setting a second range designated by a user as a reduced portion of the displayed entire first range of the multimedia stream; and
   (c) concurrently displaying the entire first range and the entire second range, wherein the displayed first and second ranges are the same size.

2. A method of claim 1, further comprising:
   displaying a starting frame of the first and second ranges designated by the user; and displaying an ending frame of the first and second ranges designated by the user.

3. A method of claim 1, wherein in (a), displaying the entire first range of the multiple stream in a first level of a multiple level display of the multimedia stream; and in (b), displaying the absolute range of the multimedia stream in a second level of the multiple level display.

4. A method of claim 3, wherein (a) further comprises:
displaying a starting frame of a designated range if a range is designated by the user; and
displaying an ending frame of said designated range.

5. A method of claim 3, further comprising repeating steps (b) and (c) for each additional range and displaying each absolute range of the multimedia stream in a different level of the multiple level display, and wherein the displayed ranges are aligned.

6. A method of claim 5, comprising:
displaying a starting frame of a range designated from each absolute range of the multimedia in each corresponding level of the multiple level display, if a range is designated by the user from an absolute range of the multimedia; and
displaying an ending frame of said range designated from each absolute range of the multimedia in each corresponding level of the multiple level display.

7. A method of claim 6, further comprising manipulating a slider bar to view each level of the multiple level display.

8. A method of claim 5, further comprising manipulating a slider bar to view each level of the multiple level display.

9. A method of claim 1, wherein in (b) the designated range is a continuous subset of the displayed entire range of the multimedia stream in (a).

10. A multi-level position/range designating method for a multimedia stream comprising:
(a) displaying a first level of a multiple level display including an entire range of a multimedia stream represented by a first timeline, wherein the entire range of the multimedia stream is displayed extending completely from a beginning to an end of the first timeline;
(b) displaying a range designated by a user from within a range of the multimedia stream displayed in a previous level timeline of the multiple level display as extending completely from a beginning to an end of a current displayed timeline, wherein the displayed timeline from each previous level and a current level timeline maintain the same displayed size; and
(c) repeating (b) to reach a kth level timeline.

11. A method of claim 10, further comprising:
displaying, for each level timeline, a starting frame of the range designated by the user; and
displaying, for each level timeline, an ending frame of said designated range.

12. A method of claim 11, further comprising manipulating a window slider bar to view each level timeline of the multiple level display.

13. A method of claim 10, further comprising manipulating a window slider bar to view each of the kth level timelines each displayed in alignment and having the same size of the multiple level display.

14. A method of claim 13, wherein the first slider bar and each of the kth slider bar has the same length.

15. A multi-level position/range designating method for a multimedia stream comprising:
(a) displaying a first level of a multiple level display including an entire range of the multimedia stream in a first window; and
(b) simultaneously displaying subsequent levels of the multiple level display including varying respectively smaller ranges of the multimedia stream in a additional windows, wherein each immediately subsequent level and current level of the multi-level position/range designating method uniformly represents an entire amount of the corresponding range of the multimedia stream at a respective uniform time scale from its beginning to its end, and wherein all said levels maintain the same displayed size and different uniform time scales.

16. A method of claim 15, further comprising:
displaying, for each level, a starting frame of a designated range if a range is designated by the user; and
displaying, for each level, an ending frame of said designated range.

17. A method of claim 16, further comprising displaying each level vertically aligned and manipulating a window slider bar in the second window to view each nth level of the multiple level display.

18. A method of claim 15, further comprising manipulating a window slider bar in the second window to view each nth level of the multiple level display.

19. A method of claim 18, wherein the window slider bar is positioned at the right side of the second window.

20. A method of claim 18, wherein the window slider bar is positioned at a prescribed location of the second window.

21. The method of claim 15, wherein all levels are displayed in the same absolute range, and wherein each subsequent level represents a continuous subset of data from the multimedia stream of a previous level.

22. A multi-level position/range designating method for a multimedia stream comprising a multiple level representation of a multimedia stream, wherein each incremented level displays a continuous more detailed but shorter range designated from an immediately previous level of the multimedia stream to achieve a refined range designation using more detailed views and a continuous subset of data from the previous level of the multimedia stream, wherein each level has an identical size when displayed, and wherein said each level is displayed aligned with the same absolute range.

23. The method of claim 22, wherein an expansion ratio between levels of the multiple level representation is different and user selected, and wherein said each level is displayed with a different uniform timescale, wherein said each level represents the corresponding range of the multimedia using its full displayed dimension.

24. A multi-level position/range designating method for a multimedia stream comprising:
(a) displaying a first range of a multimedia stream in a first prescribed display region of a display, wherein the first range is uniformly represented across the entire first prescribed display region;
(b) selecting a second reduced range from within the first range of the multimedia stream displayed in the first prescribed display region, wherein the second range is uniformly represented within a second prescribed display region; and
(c) displaying the selected second reduced range of the multimedia stream in the second prescribed display region, wherein each range and display region of the multi-level position/range designation method maintains the same displayed size.

25. The method of claim 24, wherein the second reduced range is a continuous subset of data from the multimedia stream of the first range, and wherein the first and second ranges are concurrently displayed in first and second levels of a multiple-level display.

* * * * *